(12) United States Patent
Besaw et al.

(10) Patent No.: US 10,348,612 B2
(45) Date of Patent: *Jul. 9, 2019

(54) SET UP OF DIRECT MAPPED ROUTERS LOCATED ACROSS INDEPENDENTLY MANAGED COMPUTE AND STORAGE NETWORKS

(71) Applicant: International Business Machines Corporation, Armonk, NY (US)

(72) Inventors: Nathan A. Besaw, Defiance, OH (US); Bret G. Bidwell, Hopewell Junction, NY (US); John Dorfner, Rhinebeck, NY (US); Aruna V. Ramanan, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 191 days.

This patent is subject to a terminal disclaimer.

(21) Appl. No.: 15/342,146

(22) Filed: Nov. 3, 2016

(65) Prior Publication Data
US 2017/0054629 A1    Feb. 23, 2017

Related U.S. Application Data

(63) Continuation of application No. 13/857,333, filed on Apr. 5, 2013, now Pat. No. 9,531,623.

(51) Int. Cl.
*H04L 12/24* (2006.01)
*H04L 12/703* (2013.01)
*H04L 12/707* (2013.01)

(52) U.S. Cl.
CPC .......... *H04L 45/22* (2013.01); *H04L 41/0654* (2013.01); *H04L 45/28* (2013.01)

(58) Field of Classification Search
CPC ...... H04L 45/22; H04L 41/0654; H04L 45/28
See application file for complete search history.

(56) References Cited

U.S. PATENT DOCUMENTS 7,197,536 B2    3/2007   Beukema et al.
7,281,062 B1 *  10/2007  Kuik ..................... G06F 13/385
                                                   370/395.52

(Continued)

FOREIGN PATENT DOCUMENTS

WO         2012058295 A1    5/2012

OTHER PUBLICATIONS

Dongfeng et al., "CFS: The Design and Implementation of a Cluster File System Service on Inspur AS3000", 2011 International Conference on Computational and Information Sciences, 2011. pp. 847-849.

(Continued)

*Primary Examiner* — Patrice L Winder
(74) *Attorney, Agent, or Firm* — Cantor Colburn LLP; Teddi Maranzano

(57) ABSTRACT

Embodiments relate to setting up direct mapped routers located across independently managed compute and storage networks for enabling multiple modes of communication over the cross-coupled links between the networks. An aspect includes identifying a characteristic of a local entity based on a unique location identifier assigned to the local entity and learning a characteristic of a remote entity based on a location identifier received over a cross-coupled link between the local entity and the remote entity. A port on a local entity router is then correlated with the received location identifier of the remote entity. A route is then built in the direct mapped router table at a location pointed to by the location identifier of the remote entity. An optimistic failover route is established from a storage entity to a (Continued)

compute entity when a cross-coupled link between the storage entity and the compute entity is broken.

4 Claims, 7 Drawing Sheets

(56) References Cited

U.S. PATENT DOCUMENTS

| | | |
|---|---|---|
| 7,668,981 B1 | 2/2010 | Nagineni et al. |
| 7,673,009 B2 | 3/2010 | Fein et al. |
| 7,822,889 B2 | 10/2010 | Arimilli et al. |
| 7,904,590 B2 | 3/2011 | Arimilli et al. |
| 8,380,894 B2 | 2/2013 | Gordon |
| 8,443,237 B2 | 5/2013 | Konishi et al. |
| 8,504,770 B2 | 8/2013 | Cuddihy et al. |
| 8,554,867 B1 * | 10/2013 | Mueller ............ G06F 17/30203 709/203 |
| 8,582,469 B2 | 11/2013 | Rosenberg |
| 9,134,921 B1 | 9/2015 | Li et al. |
| 2003/0012204 A1 * | 1/2003 | Czeiger ............ H04L 29/12584 370/401 |
| 2003/0115447 A1 | 6/2003 | Pham et al. |
| 2005/0138184 A1 * | 6/2005 | Amir .................. H04L 67/1097 709/228 |
| 2005/0193084 A1 * | 9/2005 | Todd .................... G06F 3/0607 709/214 |
| 2008/0077635 A1 | 3/2008 | Sporny et al. |
| 2008/0225860 A1 | 9/2008 | Manion et al. |
| 2009/0213755 A1 | 8/2009 | Lu |
| 2011/0258257 A1 | 10/2011 | Previdi |
| 2012/0158923 A1 | 6/2012 | Mohamed et al. |
| 2012/0209984 A1 | 8/2012 | Gonzalez-Banos et al. |
| 2013/0046892 A1 * | 2/2013 | Otani .................. H04L 67/1095 709/226 |
| 2013/0346532 A1 * | 12/2013 | D'Amato ............. G06F 3/0617 709/213 |

OTHER PUBLICATIONS

Levin, "Implementation Details of a Scalable, QoS-Constrained Overlay Network", Department of Computer Science, Boston University Boston, MA 02215, Spring 2004. 9 pages.

Van Hensbergen et al., "Revisiting Link-Layer Storage Networking", Technical Report RC22609, IBM Research Division, Oct. 23, 2002. pp. 1-105.

* cited by examiner

SET UP OF DIRECT MAPPED ROUTERS LOCATED ACROSS INDEPENDENTLY MANAGED COMPUTE AND STORAGE NETWORKS

DOMESTIC PRIORITY

This application is a continuation of U.S. patent application Ser. No. 13/857,333, filed Apr. 5, 2013, the content of which is incorporated by reference herein in its entirety

GOVERNMENT CONTRACT

This invention was made with the United States Government support under Agreement No. HR0011-07-9-0002 awarded by the Defense Advanced Research Projects Agency (DARPA). The Government has certain rights in the invention.

BACKGROUND

The present invention relates generally to coupled supercomputers, and more specifically, to providing direct mapped routers located across independently managed compute and storage networks for enabling multiple modes of communication over the cross-coupled links between the networks.

Supercomputers, also known as high performance computers, typically include compute resources and storage devices connected to each other through an interconnection network. The network generally includes a set of routers or switches connected to clients through an appropriate network interface on the clients or nodes. A management subsystem of these systems generally has a complete view of all the entities in the system. Typically, the storage devices are shared between multiple systems. This sharing is made possible through server nodes attached to the storage devices that communicate with compute client nodes spread across multiple systems over an independent network. If direct access to storage server nodes is desired without involving a gateway function between the two networks, the compute client nodes on each of these networks will typically obtain route table addresses of the available storage server nodes on the other network and vice versa.

BRIEF SUMMARY

According to an embodiment of the present invention, a method for setting up direct mapped routers located across independently managed compute and storage networks for enabling multiple modes of communication over the cross-coupled links between the networks is provided. The method includes identifying a characteristic of a local entity based on a unique location identifier assigned to the local entity and learning a characteristic of a remote entity based on a location identifier received over a cross-coupled link between the local entity and the remote entity. A port on a local entity router is then correlated with the received location identifier of the remote entity. A route is then built in the direct mapped router table at a location pointed to by the location identifier of the remote entity. An optimistic failover route is established from a storage entity to a compute entity when a cross-coupled link between the storage entity and the compute entity is broken.

According to another embodiment of the present invention, a system for setting up direct mapped routers located across independently managed compute and storage networks for enabling multiple modes of communication over the cross-coupled links between the networks is provided. The system includes a computer processor and logic executable by the computer processor. The logic is configured to implement a method. The method includes identifying a characteristic of a local entity based on a unique location identifier assigned to the local entity and learning a characteristic of a remote entity based on a location identifier received over a cross-coupled link between the local entity and the remote entity. A port on a local entity router is then correlated with the received location identifier of the remote entity. A route is then built in the direct mapped router table at a location pointed to by the location identifier of the remote entity. An optimistic failover route is established from a storage entity to a compute entity when a cross-coupled link between the storage entity and the compute entity is broken.

According to a further embodiment of the present invention, a computer program product for setting up direct mapped routers located across independently managed compute and storage networks for enabling multiple modes of communication over the cross-coupled links between the networks is provided. The computer program product includes a storage medium having computer-readable program code embodied thereon, which when executed by a computer processor, causes the computer processor to implement a method. The method includes identifying a characteristic of a local entity based on a unique location identifier assigned to the local entity and learning a characteristic of a remote entity based on a location identifier received over a cross-coupled link between the local entity and the remote entity. A port on a local entity router is then correlated with the received location identifier of the remote entity. A route is then built in the direct mapped router table at a location pointed to by the location identifier of the remote entity. An optimistic failover route is established from a storage entity to a compute entity when a cross-coupled link between the storage entity and the compute entity is broken.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
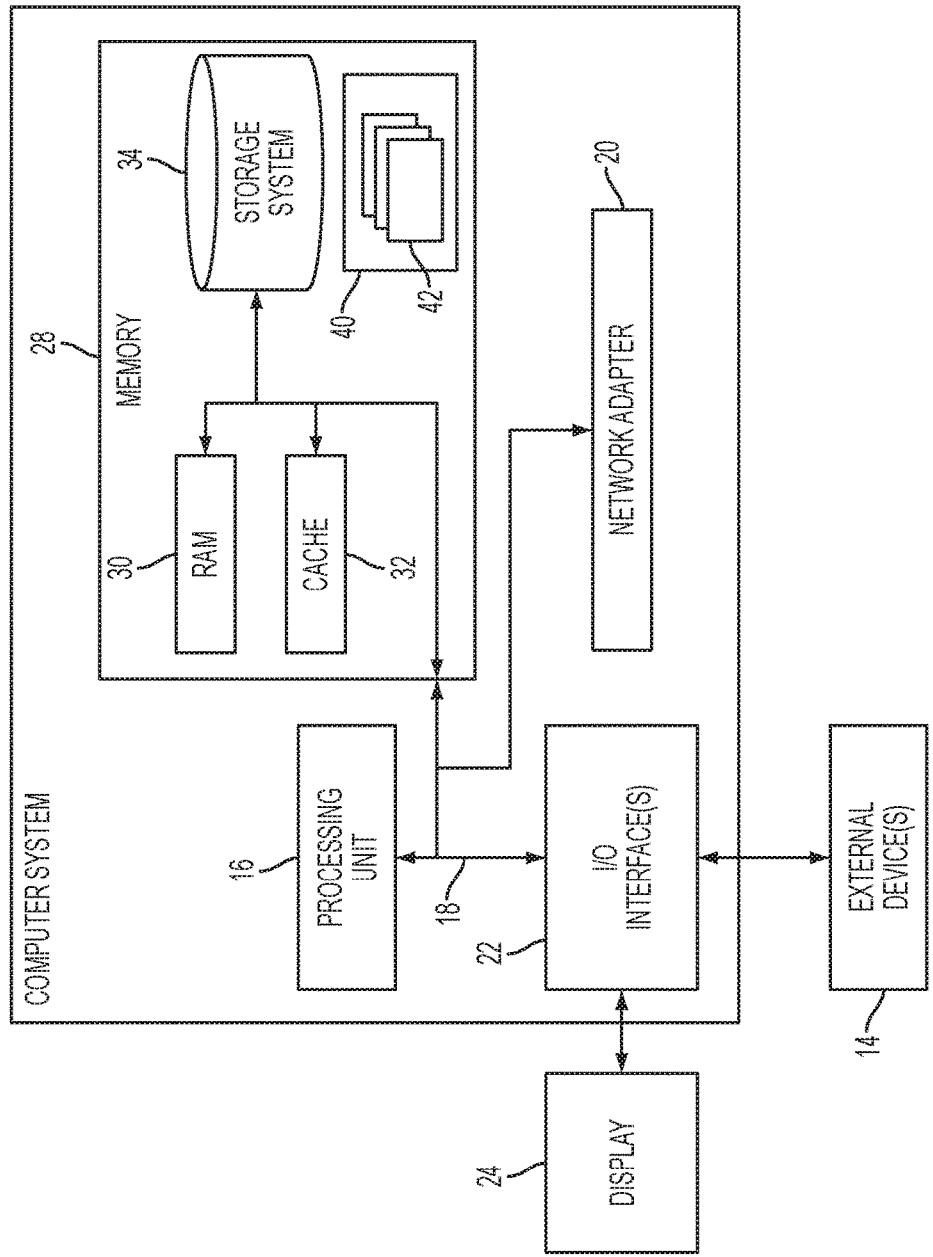
FIG. 1 depicts a block diagram of a computer system according to an embodiment.

Embodiments disclosed herein are directed to providing direct mapped routers located across independently managed compute and storage networks for enabling multiple modes of communication, like a single direct route, round robin over multiple direct routes and round robin over indirect routes, over the cross-coupled links between the networks.

An aspect of embodiments includes identifying a characteristic of a local entity based on a unique location identifier assigned to the local entity and learning a characteristic of a remote entity based on a location identifier received over a cross-coupled link between the local entity and the remote entity. A port on a local entity router is then correlated with the received location identifier of the remote entity. A route is then built in the direct mapped router table at a location pointed to by the location identifier of the remote entity. According to embodiments, an optimistic failover route is established from a storage entity to a compute entity when a cross-coupled link between the storage entity and the compute entity is broken.

In the contemporary art, if direct access to storage server nodes is desired without involving a gateway function between the two networks, the compute client nodes on each of these networks will typically obtain route table addresses of the available storage server nodes on the other network and vice versa. A conventional method to obtain route table addresses is by pre-assigning those addresses and manually exchanging the information so that the routers on either side could be set up accordingly. This conventional method, however, involves a number of manual steps and is time consuming when modifying configurations involving independently managed networks. This complexity increases when the route tables are direct mapped, that is, the route to a destination needs to be placed at the row address that matches the destination address.

Accordingly, embodiments disclosed herein provide an exemplary method for routing over the coupling links between the independently managed networks. When possible, a derivable, and therefore predictable, routing port assignment may be made in order to facilitate the communication path between a compute node entity and a storage server entity on an independently managed network. When the link to the designated port is established, the compute node must know to which storage node location it has been physically connected according to embodiments.

Embodiments disclosed herein efficiently set up communication paths between entities belonging to two similar, but independently managed, high speed networks. Such high speed networks are used as interconnects in high performance computing clusters. These clusters often have destination based interconnects with direct mapped routers, wherein the route tables are indexed directly using the destination address. Embodiments seamlessly set up the route table entries for the remote nodes as the coupling links come up. The set of possible remote addresses is preset based on the underlying architecture. Embodiments disclosed herein identify the remote nodes and find the ports not connected to nodes in the local network's domain. These ports are monitored for neighbor identity information received from the other side of the link on those ports. For each neighbor, when it becomes visible, embodiments extract its node identifier. Embodiments further build the route to the remote node using the local port leading to the remote node and place the route in the direct mapped route table at the location pointed to by the neighbor identifier. Sometimes there may be multiple paths to a destination. The router hardware may permit placing secondary paths in free locations in the route table and link the indices in a loop so that packets could round-robin over the available paths according to embodiments. According to embodiments, a process will check if multiple paths exist to the remote nodes and determine their optimal placement.

According to additional embodiments disclosed herein, each compute node in the compute network has a physical self-port reserved for connection to the storage location. These self-ports are derived by using an expected neighbor algorithm, given a compute node location identifier (ID) and a topology ID. If the expected neighbor location ID and source location ID are the same, then the port is a self-port according to embodiments. The use of self-ports in embodiments allows simple derivation of a direct route chain on a compute node to remote location. Such derivation is dependent on setting the proper distance between rows to the same destination in the route table.

Embodiments disclosed herein also address additional requirements for a set of routers on the storage clusters. One requirement of disclosed embodiments is that traffic to and from one compute cluster should not interfere with traffic to and from other compute clusters. This means no storage cluster link be shared for point-to-point communication with multiple compute clusters. Each storage server may have connections to multiple compute clusters. By nature of the communication requirements and processing power, the compute clusters will be densely populated with processing nodes with a higher density of links between them as compared to the connectivity with the storage clusters. Sometimes the storage nodes may not have a direct physical connection to every compute node in the compute network. However, each compute node within a compute cluster will have a direct route to every other compute node within that cluster by virtue of dense connectivity. According to embodiments, a fail-over route is provided from a storage node location to any compute node that is not directly connected to storage cluster, through another compute node that has connectivity to the storage node router. In addition, the storage cluster of embodiments may have additional links that are not typically used for point-to-point communication and hence may be excluded from the routes set up in the direct mapped routers.

Accordingly, embodiments disclosed herein manage the direct mapped routers on the storage clusters by addressing conditions including: (i) traffic to and from different compute clusters should not be passed over the same intra-storage cluster link, (ii) whenever connectivity to a compute client or node is not available, a fail-over path through another compute client in the same compute cluster must be provided, and (iii) intra-storage cluster links that are not allowed to pass point-to-point traffic must be excluded from the route tables.

In the contemporary art, compute client nodes on one side of the network may need to obtain a route table address of the available storage resources. Often the compute nodes will communicate within the compute network and across the links to the storage network through the round-robin use of indirect routes amongst their compute-side counterparts. In these cases, compute node indirect route chain must be assigned to the storage destination to facilitate the use of indirect routing to storage destinations.

Embodiments disclosed herein assign a valid storage node destination for compute-side indirect routing, while at the same time not allowing the storage node location to become an intermediate bounce point for indirect routing between compute nodes within the compute cluster. Embodiments also assign a valid storage node destination for compute-side indirect routing. Moreover, embodiments prevent the storage node from becoming an indirect route bounce point for communication between compute nodes in the compute cluster network. The storage node may not necessarily have connectivity to each and every compute supernode (i.e., entity) in a compute network. The storage drawer may, at any time, have a failover route in place of a direct route to the compute supernode. Because of this, the storage node cannot be used as an intermediate bounce point in any compute to compute communication via indirect route mode within a compute network.

A local node may receive a list of destinations that are reachable through intermediate compute node bounce points. When it receives this list from a central network manager, it modifies an indirect route validity table to determine which intermediate node bounce points can be applied to an indirect route chain to any destination. The storage node locations are not permitted as an intermediate bounce point for any of the compute node indirect route chains. Accordingly, embodiments disclosed herein suppress the storage node location from sending any link status to the central network manager for distribution to the compute nodes. Additionally, the storage node location does not update its indirect route validity table in response to any compute node route table update request according to embodiments. Together, this ensures that the storage drawer is isolated with respect to indirect routing within the compute cluster.

Therefore, according to embodiments disclosed herein, there are no storage nodes in the compute node indirect route chain, the storage as a destination for an indirect route chain is simply a route table jumping-off point for a chain composed entirely of compute network bounce points, and the storage node destination is not added back into the chain, as is the case where the compute direct route destination is the first link in the chain.

According to embodiments disclosed herein, the network route that leads to the storage location from the compute network must be a direct route destination for an indirect route chain. All of the indirect route bounce points that currently exist in the chain must be able to reach the storage location. The resulting indirect route chain can reach the storage location from the compute network using indirect routes. An indirect route chain is a list of round-robin bounce points that exist between a compute node and one or more destination nodes within the compute cluster network. When assembling the pool of bounce points, the process of disclosed embodiments detects a storage node location and excludes it from the indirect route chain.

Referring now to FIG. 1, a block diagram of a computer system 10 suitable for providing direct mapped routers located across independently managed compute and storage networks for enabling multiple modes of communication over the cross-coupled links between the compute and storage networks according to exemplary embodiments is shown. Computer system 10 is only one example of a computer system and is not intended to suggest any limitation as to the scope of use or functionality of embodiments described herein. Regardless, computer system 10 is capable of being implemented and/or performing any of the functionality set forth hereinabove.

Computer system 10 is operational with numerous other general purpose or special purpose computing system environments or configurations. Examples of well-known computing systems, environments, and/or configurations that may be suitable for use with computer system 10 include, but are not limited to, personal computer systems, server computer systems, thin clients, thick clients, cellular telephones, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 10 may be described in the general context of computer system-executable instructions, such as program modules, being executed by the computer system 10. Generally, program modules may include routines, programs, objects, components, logic, data structures, and so on that perform particular tasks or implement particular abstract data types. Computer system 10 may be practiced in distributed cloud computing environments where tasks are performed by remote processing devices that are linked through a communications network. In a distributed computing environment, program modules may be located in both local and remote computer system storage media including memory storage devices.

As shown in FIG. 1, computer system 10 is shown in the form of a general-purpose computing device, also referred to as a processing device. The components of computer system may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 10 may include a variety of computer system readable media. Such media may be any available media that is accessible by computer system/server 10, and it includes both volatile and non-volatile media, removable and non-removable media.

System memory 28 can include computer system readable media in the form of volatile memory, such as random access memory (RAM) 30 and/or cache memory 32. Computer system 10 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 10 may also communicate with one or more external devices 14 such as a keyboard, a pointing device, a display 24, etc.; one or more devices that enable a user to interact with computer system/server 10; and/or any devices (e.g., network card, modem, etc.) that enable computer system/server 10 to communicate with one or more other computing devices. Such communication can occur via Input/Output (I/O) interfaces 22. Still yet, computer system 10 can communicate with one or more networks such as a local area network (LAN), a general wide area network (WAN), and/or a public network (e.g., the Internet) via network adapter 20. As depicted, network adapter 20 communicates with the other components of computer system 10 via bus 18. It should be understood that although not shown, other hardware and/or software components could be used in conjunction with computer system 10. Examples include, but are not limited to: microcode, device drivers, redundant processing units, external disk drive arrays, RAID systems, tape drives, and data archival storage systems, etc.

Figure 2:
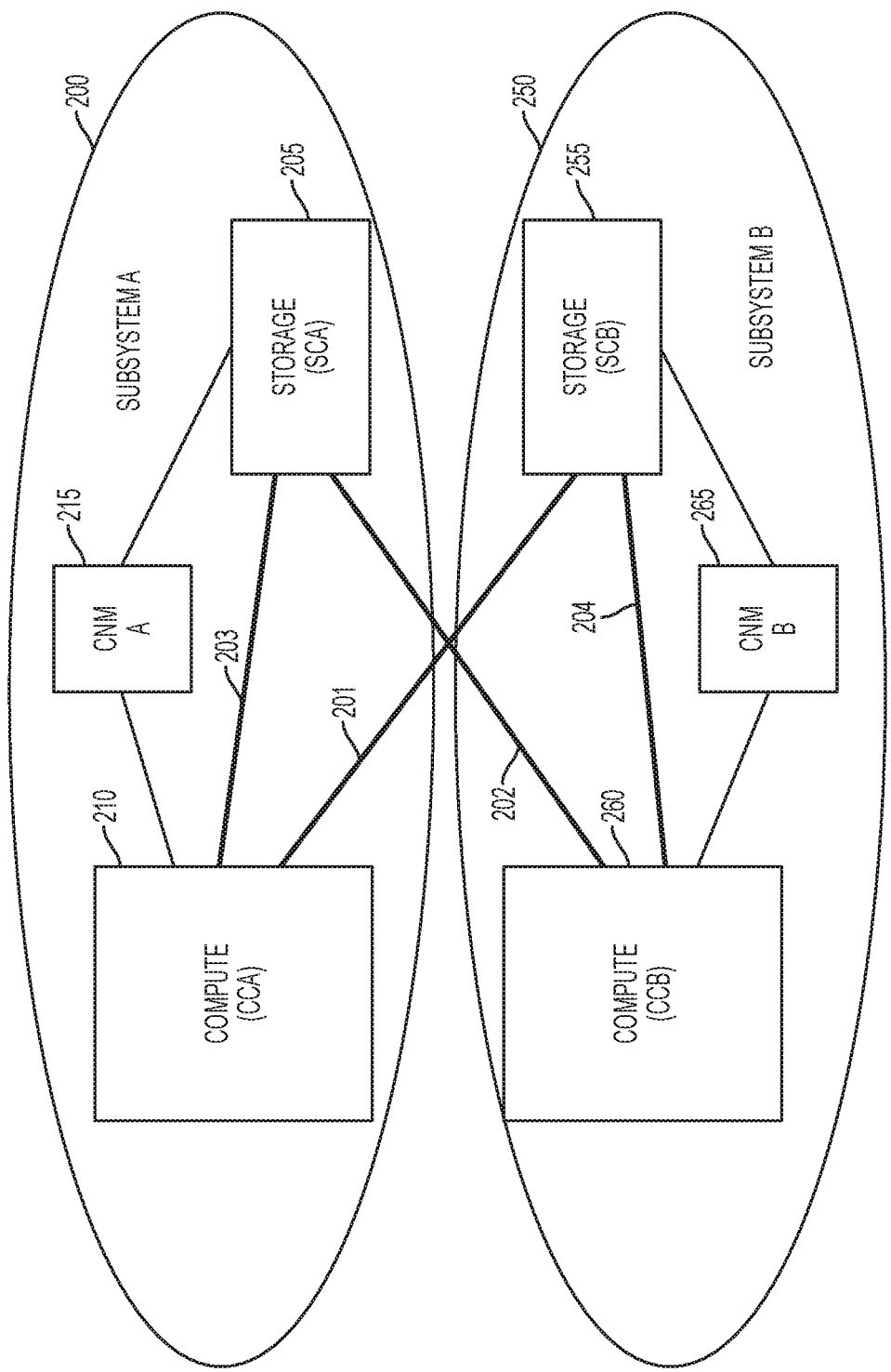
FIG. 2 depicts a representation of two independent subsystems coupled together with cross-coupled links according to an embodiment.

FIG. 2 depicts a representation of two independently managed subsystems (subsystem A 200 and subsystem B 250) coupled together with cross-coupled links 201, 202 according to an embodiment. According to an embodiment, each storage subsystem—storage cluster A (SCA) 205 and storage cluster B (SCB) 255—include a set of single drawers, whose I/O routers connect to compute supernodes (i.e., entities) of compute cluster A (CCA) 210 and compute cluster B (CCB) 260, respectively. One or more of the nodes in these drawers, henceforth called storage supernodes, may serve as storage server nodes. The server nodes may communicate with compute clients through the I/O routers on one side and with the disk subsystem through the separate interface on the other. There is only one link 203, 204 between each compute supernode and each storage supernode within each subsystem. Each storage cluster may contain more than one storage supernode connecting to the same disk subsystem. All the entities, compute supernodes and storage supernodes within each subsystem 200, 250 are handled by a single management subsystem (central network manager (CNM) A 215 and CNM B 265, respectively).

The two subsystems 200, 250 are then cross-coupled via links 201, 202 such that the storage supernodes in each subsystem are connected to compute supernodes in both. As shown in FIG. 2, CCA 210 is coupled to SCB 255 via cross-coupled link 201 and CCB 260 is coupled to SCA 205 via cross-coupled link 202. According to an embodiment, the routers on the compute nodes are allowed to connect to routers on storage server nodes in either storage cluster, SCA 205 or SCB 255. Essentially, from the point of view of the routers, they will appear to be interconnected in some pattern with apparently a path between all interface host pairs.

Given this physical layout shown in FIG. 2, there exists a set of independently managed compute clusters and storage clusters such that any compute node can access any storage node over cluster interconnects shared by both the compute cluster and the storage clusters and that any storage node can access any compute node in any compute cluster. Accordingly, this architecture ensures the availability of a cluster in the event of failure of a compute or a storage subsystem.

The basic hardware unit of clusters is a drawer which houses eight nodes (a node being a combination of processors and memory), which connect to each other as well as to nodes in other drawers through an I/O hub or router. Four such drawers are connected to each other such that there is a direct connectivity between all pairs of nodes. The unit of four interconnected drawers is called a supernode. Each I/O hub houses an Integrated Switch Router (ISR) which has electrical links, called Llocal or LL, to other ISRs in the drawer, a set of optical links called Lremote or LR, to other drawers in the supernode and another set of optical links called distance links to other supernodes in the cluster.

The pattern in which the ports are connected determines the topology of the cluster according to an embodiment. The topology is constructed in such a way that links from a specific port location on all entities will connect to the same entity at the other end. Hence, embodiments provide a well-defined map of destination entities and their assigned ports. The location assigned to the local entity, which does not connect to itself, is called a self-port. In the configuration addressed by embodiments shown in FIG. 2, storage server drawers residing in SCA 205 and SCB 255 are linked to self-ports on compute entities in CCA 210 and CCB 260. Hence, storage node destinations on compute-side route tables need to be mapped to self-ports on the compute ISR I/O hubs.

According to an embodiment, each entity is designated a characteristic that it can discover through the detection of an assigned location ID. For instance, in a cluster of entities that is not to exceed sixty-four entities, the compute entities can be distinguished by location IDs zero through fifty-nine, and the storage entities by location IDs sixty through sixty-three.

On the compute entities, self-ports are used to connect a compute entity to the storage entities. A self-port of an embodiment is a port on the compute entity that, if a maximum number of compute entities were uniformly connected to this entity, would be left-over ports that, if followed to their designated compute entity, would lead back to itself. For instance, there may be a port zero that exists on all compute entities numbered zero to fifty-nine that may be used to connect to the compute entity with location ID zero. However, since compute entity with location ID zero does not connect to itself through this port, port zero is a self-port on compute entity with location ID zero. The total number of self-ports in any one compute entity is equal to the maximum number of ports in the compute entity divided by the maximum number of entities, compute and storage, in the cluster. The self-ports are used to connect the compute entity to the storage entities.

On the compute entities, in addition to the algorithm that places the uniformly distributed compute-to-compute routes in the route tables, an embodiment provides an algorithm that can determine the self-ports that exist in the compute entity when given the compute entity's location ID. The port locations of the various self-ports within any one compute entity are different from compute entity to compute entity. This capability is needed to build the route table for compute-to-storage routes according to an embodiment.

According to an embodiment, once the self-ports on a compute entity are derived, the self-ports are correlated to the storage entities to which they connect. An embodiment feeds this mapping and provides a data structure to hold the correlated entries. This is an entirely different algorithm than the one that provides the uniformly distributed routes for compute-to-compute routing.

On the storage entities, the conventional routing algorithm no longer applies. The storage entity port to compute entity relationship of an embodiment is entirely built from scratch and is determined by a static array that populates an intermediate data structure. The intermediate data structure chooses which route to place where in the route table in response to storage-to-compute link events. The route table could eventually be populated by two means, one entirely algorithmic, in the case of compute-to-compute routing, and one by assignment by static array values, in the case of compute-to-storage and storage-to-compute routing. This is an exemplary feature needed to meld the uniformly distributed routes with the non-uniformly distributed routes.

Therefore, on the compute entity, there may be an expected neighbor algorithm that is used to generate the routes for compute-to-compute connections and a self-port assignment from a static array that is used to map the compute-to-storage connections. On the storage entity, there is a port assignment from a static array that may be used to map the storage-to-compute connections.

Figure 3:
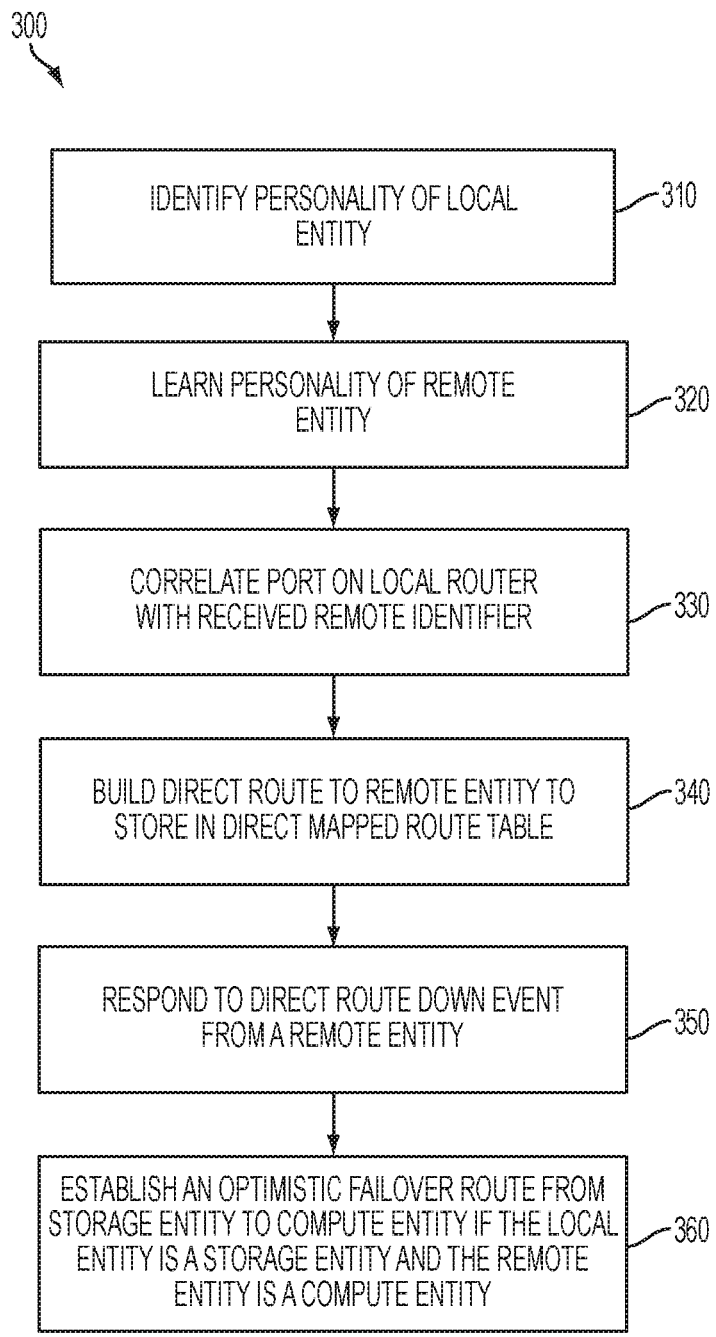
FIG. 3 depicts a process for setting up direct mapped routers located across independently managed compute and storage networks for enabling multiple modes of communication over the cross-coupled links between the networks according to an exemplary embodiment.

Referring to FIG. 3, a process 300 for setting up direct mapped routers located across independently managed compute and storage networks for enabling multiple modes of communication over the cross-coupled links between the networks according to an exemplary embodiment is shown. The process 300 may be implemented by the processing device 16 of computer system 10 according to an embodiment.

At block 310, a characteristic of a local entity is identified based on a unique location identifier assigned to the local entity. At block 320, a characteristic of a remote entity is learned based on a location identifier that is received over a cross-coupled link. The port on a local router is then correlated with the received remote location identifier, as shown in block 330. At block 340, a direct route to the remote entity built and stored in the direct mapped router table at a location pointed to by the location identifier of the remote entity. At block 350, a response may be provided in response to a direct route down event from the remote entity. If the local entity is a storage entity and the remote entity is a compute entity, then an optimistic failover route is established from the storage entity to the compute entity, as shown in block 360.

According to an embodiment, an optimistic failover route is established from a storage entity to a compute entity when a cross-coupled link between the storage entity and the compute entity is broken, as shown in block 350. The optimistic failover route passes through an intermediate compute entity.

Figure 4:
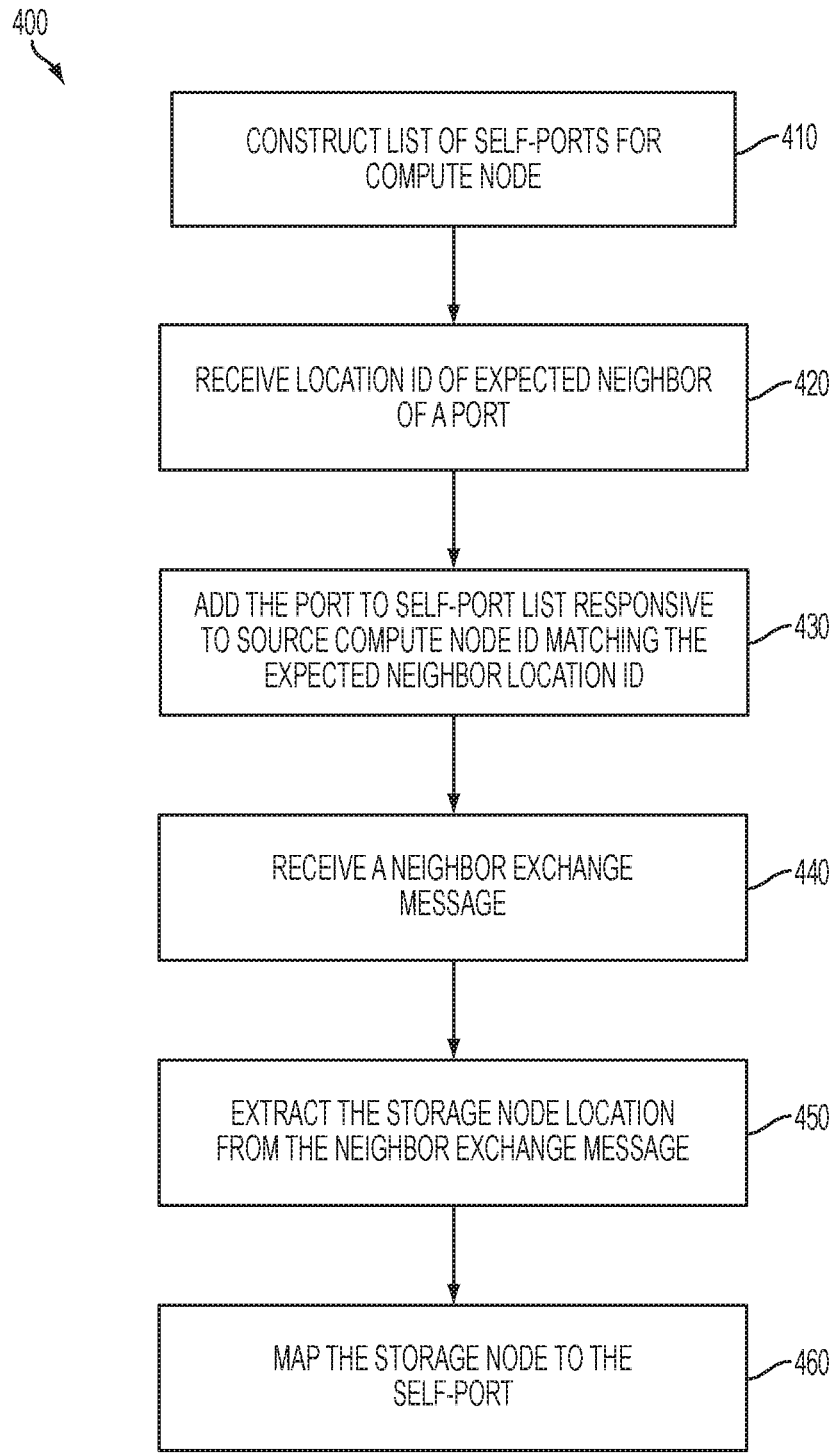
FIG. 4 depicts a process for deriving a logical port location identifier for storage node connections on a compute node in independently managed cluster networks according to an embodiment.

The identifying and learning of entity characteristics, as shown in blocks 310 and 320, are described in further detail in FIG. 4. Referring to FIG. 4, a process 400 for deriving a logical port location identifier for storage node connections on a compute node in independently managed cluster networks is generally shown. The process 400 may be implemented by the processing device 16 of computer system 10 according to an embodiment.

According to this embodiment, a characteristic of a local entity is identified based on a unique location identifier assigned to the entity and a characteristic of a remote entity can be learned based on the location identifier received over the cross-coupled link between them. Preconditions for the process 400 of an embodiment include a cluster topology in which there are independently managed compute and storage networks, a list of storage locations on the storage network to which the compute nodes must connect, and physical and logical port locations in the compute node to which specific storage node destinations must be connected.

At block 410, responsive to a node being a compute-side node with access to a storage network, a list of self-ports for the compute node is constructed. An expected neighbor algorithm is used to return the location ID of the expected neighbor for a port, as shown in block 420. The expected neighbor algorithm returns a destination location ID when given the source location ID and a network topology indicator. Details of the specific algorithm are known to those skilled in the art and an embodiment applies to any topology in which specific port locations on the network fabric are assigned to a destination. At block 430, responsive to the source compute node location ID being the same as the expected neighbor location ID for the port, the port is identified as a self-port and is added to the list. Accordingly, the self-port on the compute node to which a storage node destination must be connected is derived through an expected neighbor algorithm and a list of self-ports for the given compute node is derived according to an embodiment.

At block 440, when the link from the storage location is active, the neighbor ID exchange message is received. The storage node location is extracted from the message, as shown in block 450. The storage node location is then mapped to the self-port, as shown in block 460.

The correlating of a port on a local router with the received remote location identifier, as shown in blocks 330 and 340, is described in further detail with respect to a process for generating and querying preferred routs in independently managed clusters according to an embodiment. Primary routes, as the name indicates, are the preferred routes. They are used when looping over multiple routes is not desired. Since the location of the preferred routes depends on the type of the subsystem (A or B) and the location identifier of the storage servers, an embodiment identifies the preferred routes based on the characteristics of the entities.

Pre-conditions for generating and querying preferred routes in independently managed clusters according to an embodiment include a cluster topology in which there are independently managed compute and storage networks, a list of storage locations that exist on the storage network to which the compute nodes must connect, multiple direct routes between compute nodes within a defined cluster network and between any two compute nodes there is one and only one primary direct route and multiple secondary direct routes, and a single route table that lists all of the routes to every destination within the compute and storage sub-clusters.

To generate the preferred routes list according to an embodiment, a single preferred direct route is determined from a compute node to destinations in the range of compute node location IDs within a specified topology. Accordingly, there will be a list of preferred routes for single direct routing between compute nodes within a single cluster network from which the type of route can be determined.

According to an embodiment, the preferred routes list may now be queried. Given a destination location ID, a status indicator is provided to indicate whether a route is a preferred route (e.g., True/False). The preferred routes list is then searched for the destination location ID. If the destination location ID is on the list, it is a preferred route. If not, then it is not a preferred route.

According to an embodiment, a destination location ID may be determined given a route table index. Given a route table index, the destination location ID of the compute node to which a secondary route belongs may be provided. If the route table index is the preferred route, the preferred route is returned. If the route table index is a secondary route, the preferred route is returned. The destination location ID is the location in the route table to which the preferred route points according to an embodiment.

Figure 5:
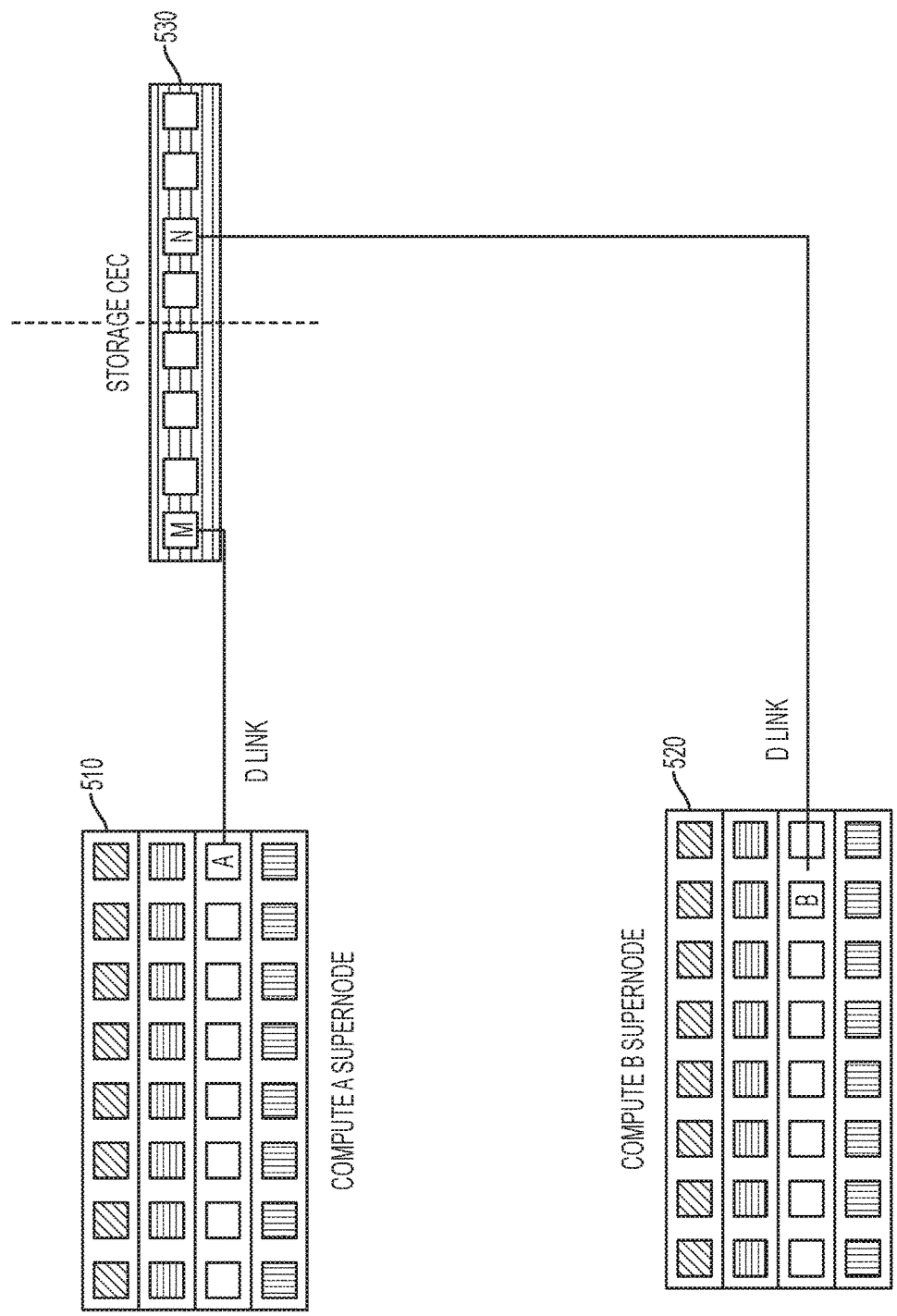
FIG. 5 depicts a linking connection between compute entities and storage entities in a drawer according to an embodiment.

Referring to FIG. 5, in order to satisfy the condition that traffic to and from different compute clusters should not be passed over the same intra-storage cluster link, CCA supernodes 510 are connected to four hubs on the left and CCB supernodes 520 are connected to the four hubs on the right of the SCA and SCB supernodes 530 as shown in FIG. 5. The compute cluster supernodes are four drawer supernodes and the storage cluster supernodes are single drawer supernodes.

All CCA and CCB supernodes 510, 520 connect to all SCA and SCB supernodes 530. So there always exists a direct connection into the assigned side on the storage drawer. Since all I/O hubs in a drawer have all-to-all connectivity over LL links, no two compute A and compute B supernodes will share the same LL link. So, irrespective which of the eight nodes in the storage CEC are storage servers, each storage server has no overlapping paths to and from the two compute clusters. Accordingly, the route tables on each I/O hub should have entries to route packets to all compute nodes on either compute cluster.

The storage node must generate a reference ideal route table to track the route availability of compute nodes within multiple compute networks. An embodiment generates a map of those port connections, such that each port has an associated expected compute neighbor location. Within this structure, the ideal route table for each storage node location can be populated by assigning compute locations from an initialized array of location values.

According to an embodiment, an ideal route table is populated for compute locations from an initialized array of location values. A destination supernode location can be described by a connection map in the range:
[MAX_DRAWERS_PER_SUPERNODE] [MAX_HUBS_PER_DRAWER] [MAX_DLINKS_PER_HUB] as supernode_map [drawer] [hub] [dlink].

The source drawer within a supernode constructs the map of the expected supernode IDs on the other end of the range of links within the supernode. The expected neighbor location is given by a supernode ID, such that, for any drawer, hub, and link in the source supernode, the destination supernode ID can be derived. The range of all supernodes connected to the source supernode is thereby generated and placed in an ideal route table on each hub in the source drawer.

The next step is to construct the ideal route table on each hub, using the supernode_map that was populated from the array of supernode values. A set of routing port ids are associated with a supernode index, which is derived from the supernode ID taken from the supernode_map, and the route table is filled out for all port IDs.

The establishing of an optimistic failover route, as shown in block 350, is described in further detail with respect to a process for providing a failover route to a compute node on a storage node location according to an embodiment described below. According to an embodiment, an optimistic failover route from a storage entity to a compute entity is established to pass through an intermediate compute entity when the cross-coupled link between the storage entity and the compute entity is broken.

Preconditions for the process for providing a failover route to a compute node on a storage node location include a cluster topology in which there are independently managed compute and storage networks, a list of compute node locations existing on multiple compute networks to which the storage node must connect, multiple direct connections between every pair of compute nodes, at least one compute node connected to each and every storage node location, and not every compute node has a direct connection to every storage node location.

According to an embodiment, if an entity is a storage-side node with access to multiple compute networks, then for every compute node location to which a failover route is needed, a suitable bounce point is found within the same compute cluster by lookup in an indirect route validity table. If that route is not itself a failover route and has a direct connection to the storage node location, then the route is used as a failover route to a compute node that does not have a direct connection to the storage node location. Accordingly, there are now failover routes between a storage node location and compute nodes to which the storage node location has no direct route.

The system of an embodiment may include a sub-cluster of uniformly connected compute entities connected to two sets of storage entities (e.g., SCA and SCB). The compute sub-cluster and one set of storage entities may be in one management domain, and a second set of storage entities may be in another management domain. Each set of storage entities may be independently connected to the compute sub-cluster. According to an embodiment, there is no storage-to-storage routing and the compute sub-cluster cannot be used as an intermediate bounce point for storage-to-storage routing.

Regardless of management domain, the routing engine of each entity will continue to respond to link events that trigger port states on the entity on which it resides. On the compute entities, the addition of another set of storage entities connected to compute entity self-ports does not represent a significant change from the conventional art. The second set of storage entities are given a range of unique location IDs, and the storage location ID to port association is made and mapped on the compute entity, just as in the conventional art.

The SCB storage entities must, however, be given location IDs that exceed the range of location IDs that could possibly exist in the fully connected compute cluster. For instance, if the total number of entities that could be interconnected within the compute sub-cluster was sixty-four, with location IDs from zero to sixty-three, and four storage entities (SCA) are connected with a range of location IDs from sixty to sixty-three inclusive, then the second set of storage entities (SCB) must of necessity have location IDs that are greater than sixty-four. This must be the case if the goal is to not reduce the number of compute entities in the compute sub-cluster by replacing them with the second set of storage entities.

The route table on each compute entity is a fixed dimension hardware structure that has five hundred twelve rows. When the maximum number of entities to which any entity can be connected is sixty-four, the route table can be thought of being divided into eight regions of sixty-four rows each. The region that contains the row numbers that correspond to the location IDs of the other entities in the system is called the primary routes region. The other seven regions are called the secondary routes regions. Conventional art has the primary region, by definition, contained within a single, contiguous set of rows, visualized at the top of the route table. With the addition of the second set of storage entities, with location IDs that lie outside of this previously defined primary region, the concept of contiguous primary region must be replaced by a concept of a set of primary routes which can occur dispersed in the route table. For the purpose of maintaining the route tables and providing advanced route modes, such as chained direct and chained indirect routing, an embodiment generates a list of primary route indexes, queries a route table index, and returns the primary route index for a given route table index.

The characterization of a primary route and a secondary route is a concept that relates to there being multiple direct routes from a source entity to a destination entity. For any source and destination pair, there is a primary direct route and there are multiple secondary direct routes. Prior to the addition of the second set of storage entities, the distance in rows between a primary route and the first secondary route (i.e., a stride), was equal to the maximum number of entities possible within the cluster. Each subsequent secondary route was found at a stride's distance in the table, and when the bottom of the table was reached, the primary route could again be reached by counting a stride's number of rows from the last secondary route to the bottom of the table and the remainder of rows from the top of the table. In this way, a chain of direct routes could be constructed, using a constant stride for any destination in the cluster.

The addition of a second set of storage nodes, with their location ID assignment outside of the original stride of the route table and their multiple route's placement at an interval in the route table greater than a stride's number of rows, means that there is no longer a single constant stride. The relationship between multiple routes to storage entities in the compute entity route table, the storage stride, is not the same as that between the compute entities, the compute stride. The stride for a given route table index must therefore be calculated based on the index and the character of that primary route, storage or compute according to an embodiment. This causes the functions that are used to build direct route chains on the compute entities within their route tables to add an additional check for the type of destination entity and the appropriate stride for that type of destination entity.

The storage entity (SCB), because it is in a different management domain, has no information regarding the inter-connectedness within the compute sub-cluster. In conventional art, network management software was used to notify each entity in the cluster regarding the status of the links and their inter-connectedness. This was made easier by the fact that all entities were uniformly connected for each and every entity in the cluster. In this way, a source compute entity could determine if another compute entity could be used as an intermediate bounce point to reach a destination compute entity.

Validation of the suitability of an intermediate bounce point to reach a particular destination finds its application in advanced routing features such as failover routing and chained indirect routing. Since the ability for the storage entity to validate the suitability of an intermediate bounce point is now lost, there needs to be a set of guidelines and assumptions to follow that will allow those route modes to be utilized in storage-to-compute communications while mediating the risk of creating communication failures. As a result, the storage entity makes two assumptions about the compute entity sub-cluster: (i) all compute entities are available at all times and there are enough multiple links between pairs of compute entities that a completely isolated compute entity will be an eventuality so rare that its probability can be assumed to be close to zero; and (ii), by extension, a failover route, a route that uses an intermediate bounce point within the compute sub-cluster to reach a destination compute entity, can be safely used as a substitute for a direct route as long as there is a valid direct route to the intermediate bounce-point within the compute sub-cluster.

A route from the storage entity to the compute entity could be a primary direct route, or, if there are multiple direct routes from the storage entity to the compute entity, a secondary direct route, or, if no direct routes are available, a failover route. A failover route is an indirect route that uses an intermediate bounce point compute entity within the compute sub-cluster to reach the destination compute entity. Since it has been established that an embodiment may use a failover route from the storage entity to the compute sub-cluster at any time, regardless of whether a particular compute entity had ever been connected to the storage entity, and that it is expected that the compute entity not only exists in the compute sub-cluster, but has more or less full connectivity to all other compute entities, this is termed "optimistic failover". An optimistic failover route may always be employed, even when the primary direct route is available. However, direct routes, when available, will always have priority in the route table.

Since the choice had been made to use the concept and practice of optimistic failover in the set of storage entities that did not share the same management domain as the compute sub-cluster, there is no reason not to use optimistic failover in a set of storage entities that do share the same management domain as the compute sub-cluster, thereby saving the management overhead associated with the network manager's transmission of the inter-connectedness data to the storage entities.

Figure 6:
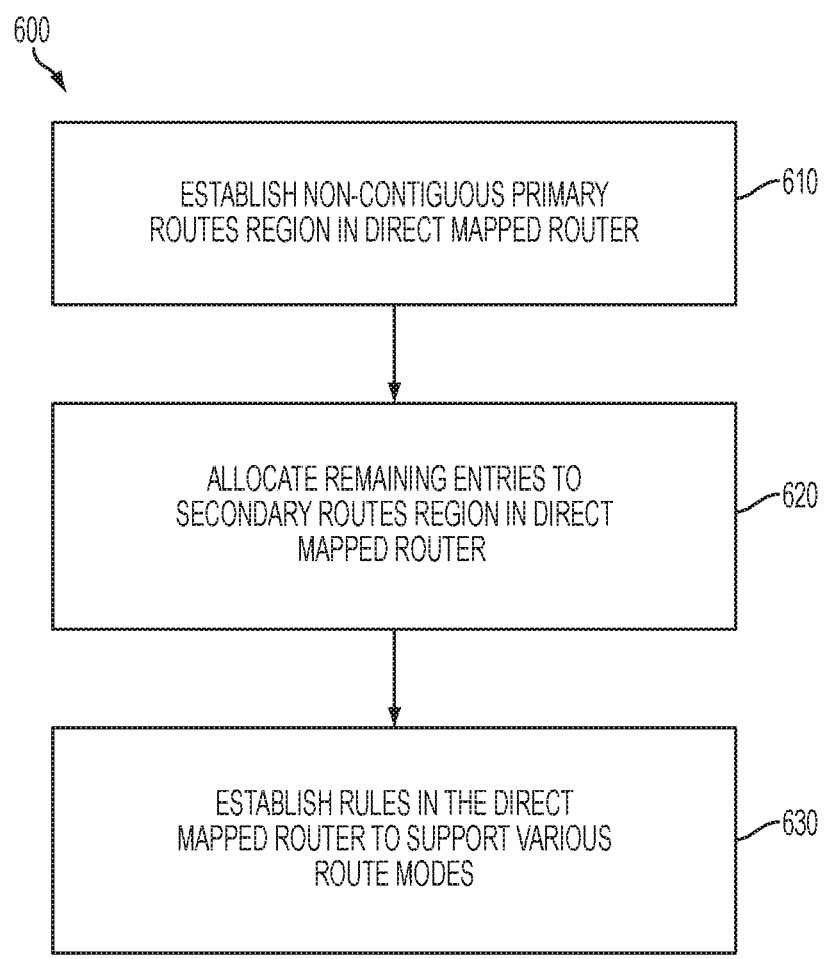
FIG. 6 depicts a process for setting up direct mapped routers located across independently managed compute and storage networks for enabling multiple modes of communication over the cross-coupled links between the networks according to another exemplary embodiment.

Referring to FIG. 6, a process 600 for setting up direct mapped routers located across independently managed compute and storage networks for enabling multiple modes of communication over the cross-coupled links between the networks according to another exemplary embodiment is shown. The process 600 may be implemented by the processing device 16 of computer system 10 according to an embodiment.

At block 610, a non-contiguous primary routes region is established in a direct mapped router for a preferred route to all destinations. At block 620, all remaining entries are allocated to a secondary routes region that includes other possible routes to a destination. Rules are then established in the direct mapped router for supporting various route modes, as shown in block 630. These various route modes include a direct mode, a chained direct mode, and a chained indirect mode. The direct mode of an embodiment always uses the preferred (shortest path) route in the primary region. The chained direct mode of an embodiment round-robins over all the shortest path routes (one in the primary routes region and all others in the secondary routes region). The chained indirect mode of an embodiment round-robins over a set of longer paths passing through one other entity in the cluster.

The establishing of a non-contiguous primary routes region and the allocating of remaining entries in the secondary routes region of the direct mapped router, as shown in blocks 610 and 620, will be discussed in further detail with respect to a process for deriving a route table stride for storage node locations on a compute node in cross-coupled networks and in asymmetric cluster networks.

Figure 7:
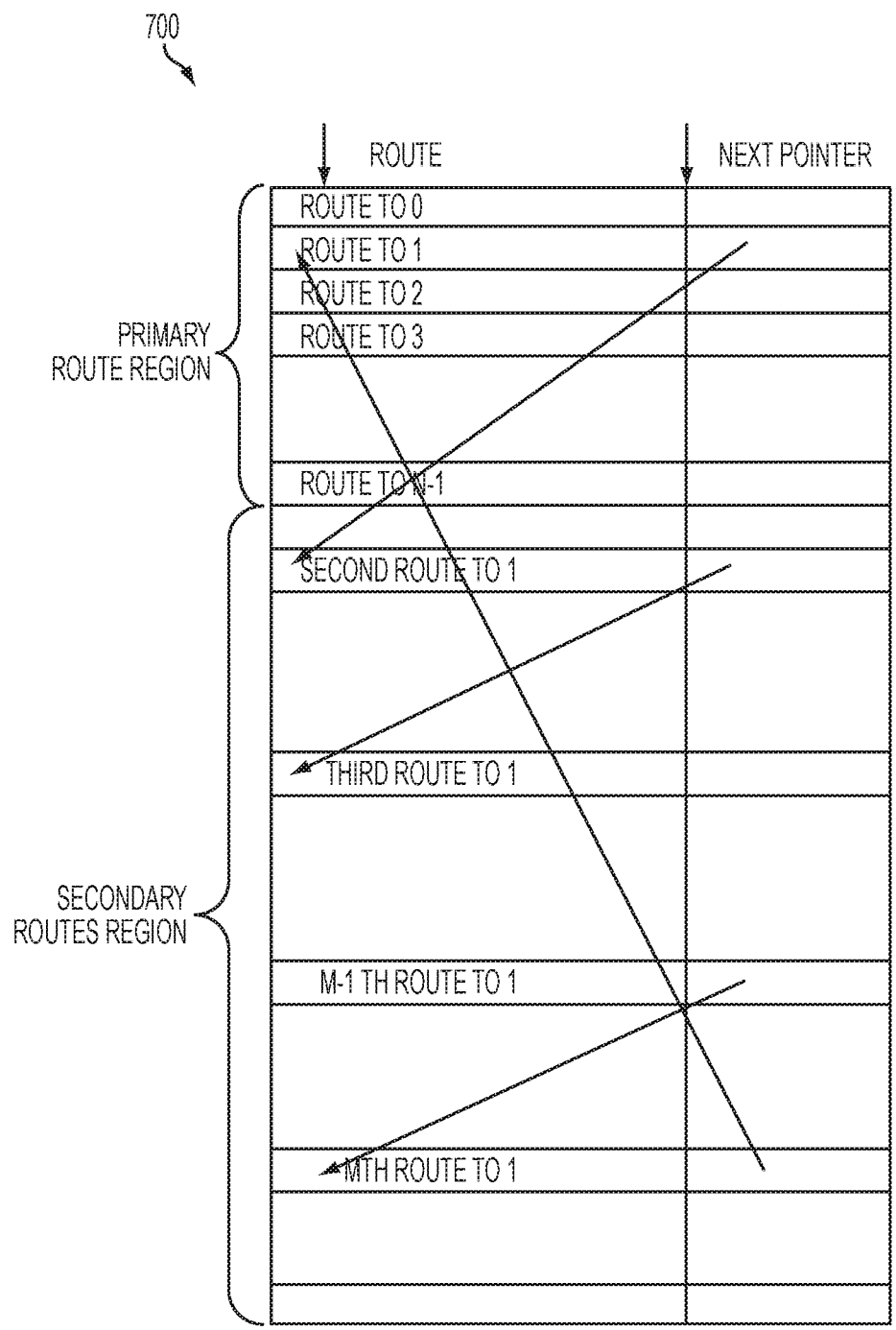
FIG. 7 depicts a direct mapped destination route table according to an embodiment.

FIG. 7 represents a direct mapped destination route table 700 of an embodiment. When the hardware can support M routes to N destinations, the size of the table will be M*N with a next pointer tagged to every row, as shown in FIG. 7. While the next pointer of the primary route will point to a row in the secondary route region, all but one of the routes in the secondary region will point to another row in the secondary region, while the remaining one in the secondary region will point back to the primary region route to complete the loop. In the configuration of FIG. 2, supernode IDs 0 through N−1 are reserved for use by subsystem A 200 and while subsystem B 250 is allowed to use supernode IDs N to 2*N−1. Note that N is equal to MAX SUPERNODES stipulated by the topology of the compute cluster. Within subsystem A 200, one of the supernode IDs not used by CCA 210 will be picked for each SCA 255 drawer. Likewise, within subsystem B 250, one of the supernode IDs not used by CCB 260 will be picked for each SCB 255 drawer. CCA supernode IDs follow the connectivity rule set by the topology. CCB supernode IDs will be the value set by the connectivity rule of the topology offset by N. CCA hubs will contain routes to CCA nodes, SCA nodes and SCB nodes. The primary route region will be the contiguous row locations 0 through N−1 and the rows pointed to by SCB supernode IDs. Rows other than those in the primary region will be used for secondary routes. The routes to CCA nodes in the loop will be placed at constant stride of N starting with the primary route. Multiple routes to SCA nodes cannot use the stride N since the location at the first stride may be reserved for an SCB node. A stride of 2*N is chosen to avoid the conflict. The primary route region on CCB nodes will include the contiguous row locations N to 2*N−1 and the rows pointed to by SCA supernode IDs. The routes to CCB nodes in the loop will be placed at constant stride of N starting with the primary route with the last route of the loop at the top of the table segment of N rows. Like SCA nodes, multiple routes to SCB nodes will be assigned a stride of 2*N.

The process for deriving the route table stride for storage node locations on a compute node in cross coupled cluster networks according to an embodiment is described below. Preconditions for the process for deriving the route table stride for storage node locations on a compute node in cross coupled cluster networks include a cluster topology in which there are independently managed compute and storage networks, a list of storage locations that exist on the storage network to which the compute nodes must connect, a single route table to manage all destinations within multiple independently managed cluster networks, and multiple routes to a single storage location to which this compute node is connected.

According to an embodiment, if this is a compute-side node with access to a storage network, then for each storage location on the list of known storage locations, the route table stride is derived for the storage location, given the storage node location ID and the topology indicator. Accordingly, the stride in the compute node route table is derived for the storage node location according to an embodiment.

The placement of multiple routes to the same destination obeys the stride which is built into the algorithm used to populate the table. It is important for route table set up purposes to be able to query the stride as the set up relates to determining the multiple routes to the same destination, especially as this value is variable depending on the location of the source hub within the cluster network. The stride is the distance in the route table, in terms of supernode indices, that successive direct routes can be expected to be placed from one another. Typically, the stride is a number equal to the maximum number of supernodes supported by the network topology. In some cases, however, although two locations within the same network have the same topology indicator, they must have a different stride due to the types of network devices to which they are connected.

The process for deriving the route table stride for storage node locations on a compute node in asymmetric cluster networks according to an embodiment is described below. Preconditions for deriving the route table stride for storage node locations on a compute node in asymmetric cluster networks include a cluster topology in which there are independently managed compute and storage networks, a list of compute node locations that exist on multiple compute networks to which the storage node must connect, and a single route table to manage all destinations within multiple independently managed cluster networks.

According to an embodiment, if this is a storage-side node with access to multiple compute networks, then the storage location is used to determine which array to apply to the route table. An ideal route table is then generated that is specific for this storage location. Accordingly, an ideal route table is generated for storage to compute network communication according to an embodiment.

The establishing of rules in the direct mapped router for supporting various route modes, as shown in block 630, will now be discussed in further detail.

With regard to the direct mode of an embodiment, once an ideal route table is constructed, the routing engine responds to network link events, namely a link up or a link down event, and attempts to align the actual route table and the hardware route table with the known routes in the ideal case. If an ideal route is not available, or if an ideal route goes down, as inferred from the link down event, then a substitute route is put into the preferred routes position. The mechanism by which the routing engine learns the state of the links that comprise the various routes in the network is through a bit mask that represents the many ports within the supernode to which both internal and external network devices are attached. An exemplary feature of an embodiment is the ability to suppress the route table update that would be associated with specific ports as they experience a link up or a link down event. This technique is used in the storage network to reserve storage-to-storage links for global counter traffic.

In other words, the mechanism by which the routing engine learns the state of the links that comprise the various routes in the network is through a bit mask that represents the many ports within the entities to which other entities are attached. An exemplary feature of this disclosure is the ability to suppress the route table update that would be associated with specific ports as they experience a link up or a link down event. The ports that require suppression of route table update are known and they are masked to the link usability bitmask, prior to sending this information to the routing engine.

The process for suppressing a storage node to storage node route table update in independently managed cluster networks according to an embodiment is described below. Preconditions for suppressing a storage node to storage node route table update includes a cluster topology in which there are independently managed compute and storage networks, a list of storage locations that exist on the storage network to which the storage nodes must not connect, a list of currently active routing port expressed as a link usability bit mask, and a list of ports that must be excluded from consideration to suppress the route table update between storage nodes.

According to an embodiment, if this is a storage node with access to the storage network, a port exclusion bit mask is constructed from an algorithm given the storage node location and the network topology indicator. A link usability bit mask is then received that indicates the currently active port locations. A new link usability mask is made from the link usability mask received and the port exclusion mask. The new link usability mask is then sent to perform a route table update, but suppresses any changes associated with the excluded ports. Accordingly, the route table update is suppressed for storage to storage link activation according to an embodiment.

With regard to the chained direct mode of an embodiment, when starting with an ideal route table and selecting a preferred route and using the stride, it is then possible to construct direct route chains to a single location in the network or networks to which the compute node is connected.

A process for deriving an ideal direct route chain for storage node locations on a compute node in asymmetric cluster networks according to an embodiment is described below. Preconditions for deriving an ideal direct route chain for storage node locations on a compute node in asymmetric cluster networks include a cluster topology in which there are independently managed compute and storage networks, a list of storage locations that exist on the storage network to which the compute nodes must connect, a single route table to manage all destinations within multiple independently managed cluster networks, and multiple routes to a single storage location to which this compute node is connected.

According to an embodiment, if this is a compute-side node with access to a storage network, then for each storage location on the list of known storage locations, the route table stride is derived for the storage location, given the storage node location ID and the topology indicator. The storage location(s) at stride are added to the direct route chain. As many chains may exist as there are independent storage node locations according to an embodiment. Accordingly, a direct route chain is constructed that allows access to a single storage node location across multiple direct routes from a compute node according to an embodiment.

With regard to the chained indirect mode of an embodiment, indirect routes typically use an intermediate bounce point entity to connect a pair of source and destination entities. In a typical configuration storage node-to-storage node indirect routing is given by the path A→B→C, where A is the source, C is the destination, and B is an intermediate bounce point that can be any other entity in the cluster besides A, the source, or C, the destination. A failover route is a route that is used in place of a direct route, when a direct route between a source and destination entity is not available. Since the routes on the storage entities may contain failover routes, which are themselves indirect routes within the compute sub-cluster, it is not possible to use the storage entities as bounce points for compute-to-compute indirect routing. Compute-to-compute indirect routing cannot use any storage entity as an intermediate bounce point.

Accordingly, an embodiment constructs the indirect route chains on the compute entities such that when a pool of potential intermediate bounce points is built, the storage entities are not added to the pool. However, the storage entities are still destinations that require an indirect route chain assignment, and therefore need to be considered separately and assigned an indirect route chain made entirely of compute entities for which they are the initiating route.

In a system including two sub-clusters of uniformly connected compute entities connected to a single set of storage entities, the set of storage entities and one compute sub-cluster is in one management domain and a second compute sub-cluster is in another management domain. Each compute sub-cluster is independently connected to the set of storage entities. There is no compute-to-compute routing between CSNA and CSNB; and the storage entity must not be used as an intermediate bounce point for compute-to-compute routing. Regardless of management domain, the routing engine of each entity will continue to respond to link events that trigger port states on the entity on which it resides. The route tables and routing characteristics of CSNB are similar to those of CSNA. Since all entities within the entire system must be tagged with a unique location ID, the location IDs of CSNB are given in the range between the maximum number of supported entities and two times the maximum number of supported entities minus one. Because an embodiment allows for primary routes to exist anywhere within the route table and the stride to be associated to the route table index, there is no change in the characteristics of CSNB as compared to CSNA.

The storage entity is now connected to two independent compute sub-clusters. The range of compute entity location IDs to which the storage entity is required to route is doubled. Since there are no connections between the compute sub-clusters, CSNA and CSNB, failover routing on the storage entity must take steps to ensure that the intermediate bounce point is a compute entity within the same compute sub-cluster as the destination compute entity. On the storage entity, the indirect route chains, which are a round-robin collection of routes that use intermediate bounce points to connect a pair of source and destination entities, must also take steps to ensure that the intermediate bounce points within an indirect route chain are only those compute entities that reside within the destination compute entity's compute sub-cluster.

According to an embodiment, the storage entity may construct two pools of bounce points, one pool for each compute entity sub-cluster. The storage entity may also construct two destination groups of compute entities from the same compute sub-cluster and associate a destination group with an indirect route chain in the same compute sub-cluster. The implementation of these restrictions would create an additional path within the current code to generate and apply indirect route chains for each compute sub-cluster. The restrictions are instituted through selective filtering of the compute entity route table index and the corresponding port id to keep the pools of bounce points and destination groups segregated by compute sub-cluster. This is similar to the filtering that takes place during validation of a storage-to-compute failover route.

In some storage to compute networks, the configuration, either intentional or as a result of a loss in point-to-point direct route capability, a compute node ISR can only become reachable from the storage node by way of another compute-side network ISR. A failover route can be used in place of the direct route. If this scenario occurs by design, then a failover route can be used in place of an entirely absent direct route. This is called an "optimistic" failover route, because it is being used in the absence of any concrete determination that a path exists between the bounce point in the compute network and the destination compute node ISR. In fact, this is always the case when the storage network is connected to two or more independently managed compute networks. Whereas information about the interconnectedness of a single network can be shared amongst the participant routers within that network, the dissemination of this information is not feasible in the case of independently managed and cross-coupled clusters. The assumption that underlies "optimistic failover" is that there are sufficient direct routes between pairs of supernodes within the compute networks, such that complete isolation of a compute node within any supernode in that network becomes a relatively rare event. The typical way in which the interconnectedness of nodes within a network is managed is through a table of indirect route validity (IRV) bits provided in the hardware.

Indirect route validity bits are hardware bits that indicate whether or not a remote compute node destination can be reached through an intermediate bounce point within the compute cluster. In a cross-coupled topology, the storage node is physically connected to two independently operating compute clusters. The problem is to populate the indirect route validity such that the compute nodes in sub-cluster A will be the intermediate bounce points to other compute nodes in sub-cluster A and the compute nodes in sub-cluster B will be the intermediate bounce points to other compute nodes in sub-cluster B and no other combination is permissible. This type of restriction can be enforced through the selective population of the indirect route validity table on the storage node. The IRV table will allow the router on the storage node to determine if a destination node in the compute network is reachable through any other node in the same compute network. The IRV table on the storage node ISR is maintained as a static table, whereas if there had been full knowledge of the interconnectedness of all networks to which the storage node is attached, it would be a dynamic table.

The process for IRV table setup on the storage node ISR will be described below. The process for setting storage node indirect route validity bits for indirect routes to a compute cluster in independently managed cluster networks according to an embodiment includes the preconditions of a cluster topology in which there are independently managed compute and storage networks, a list of storage locations that exist on the storage network to which the compute nodes must connect, and a number of independent indirect route chains on each storage node that can be constructed to target a specific set of compute node destinations. This is accomplished through the use of an indirect route validity table, which must be populated on the storage node.

According to an embodiment, if this is a storage node location with access to multiple compute networks, then for each compute node location in the indirect route validity table and for every compute node location that is considered to be an intermediate bounce point, if the intermediate bounce point is in the same sub-cluster as the target compute node, the indirect route validity bit is set in the table for location (e.g., compute node, bounce point). Accordingly, the compute nodes will be reachable from a storage location through the use of indirect routes whose intermediate bounce points are in the compute node's sub-cluster only according to an embodiment.

An exemplary embodiment addresses the selective exclusion of storage network bounce points from an indirect route chain on the compute node ISR when the compute node ISR receives a list from the Central Network Manager (CNM) that gives the supernode connection status of a storage node's direct routes to compute supernodes in any compute networks to which it is connected. If a compute node receives this information from the CNM, then it can ignore this, thereby leaving all of the associated Indirect Route Validity bits 'off' in the TRV table that corresponds to this storage destination.

A process for ignoring an indirect route validity update on a compute node for a storage node destination in independently managed cluster networks according to an embodiment is discussed below. Preconditions for the process include a cluster topology in which there are independently managed compute and storage networks, a list of storage locations that exist on the storage network to which the compute nodes must connect, a number of independent indirect route chains on each compute node that that can be constructed to target a specific set of compute node destinations (this is accomplished through the use of two lists: the indirect route chain and the destination group the chain is meant to service), and each compute node maintains an indirect route validity table for determining acceptable indirect route bounce points within the compute cluster.

According to an embodiment, if this is a compute node in a compute cluster attached to a number of storage nodes, then when an indirect route validity table is received from a storage node location, do not update the indirect route validity table on the compute node. Accordingly, the storage location cannot be used by hardware as an indirect route bounce point in a compute node indirect route chain by not updating the indirect route validity table on the compute node location with connection information about the storage node location.

One aspect of ensuring the exclusion of an indirect route through a storage node location is to leave the IRV bits 'off' for port IDs to the storage destination in the compute node ISR's IRV table. This, however, alone does not prevent the compute node routing engine from building an indirect route chain that contains a storage node location as a bounce point.

An exemplary embodiment addresses how the storage node location route is excluded from the indirect route chain on the compute node ISR. The process for omitting a storage node location route in a compute node indirect route chain in independently managed cluster networks according to an embodiment is described below. Preconditions for the process include a cluster topology in which there are independently managed compute and storage networks, a list of storage locations that exist on the storage network to which the compute nodes must connect, and a number of independent indirect route chains on each compute node that can be constructed to target a specific set of compute node destinations (this is accomplished through the use of two lists: the indirect route chain and the destination group the chain is meant to service).

According to an embodiment, if this is a compute-side node with access to a storage network, then construct the pool of indirect route bounce points by considering the active physical connection to this compute node. That includes testing that the indirect bounce point under consideration is storage location. If the condition is true, exclude the storage location destination from the indirect route chain. Accordingly, the storage location will not be part of an indirect route chain according to an embodiment. This process is repeated for any change in network integrity on all networks to which this compute node is connected.

Once the indirect route chains are constructed on the compute node ISR, the various destinations, both the compute node and the storage node destinations, must have an indirect route associated with their destination as targeted in the route table. Directly routed compute node destinations can themselves be a part of the indirect route chain that services that destination, but the storage node destination cannot be part of the chain. The storage node destination must only serve as a jumping off point for an indirect route chain entirely comprised of compute node indirect bounce points.

This is accomplished in an exemplary embodiment by adding the storage node location to the destination group serviced by the indirect route chain, as shown below, while keeping it out of the chain itself, as shown above. The inclusion of the storage location route to an indirect route chain comes with the provision that all of the indirect route bounce points that currently exist in the chain also be able to reach the storage location.

The process for assigning a compute node indirect route chain to a storage node destination in independently managed cluster networks according to an embodiment is described below. Preconditions for the process include a cluster topology in which there are independently managed compute and storage networks, a list of storage locations that exist on the storage network to which the compute nodes must connect, a number of independent indirect route chains on each compute node that can be constructed to target a specific set of compute node and storage node destinations (this is accomplished through the use of two lists: the indirect route chain and the destination group the chain is meant to service).

According to an embodiment, if this is a compute-side node with access to a storage network, then for each storage location on the list of known storage locations, test that the storage location is reachable from all of the bounce points in the indirect route chain and all of the compute-side destinations that are serviced by that chain.

If the condition is true, put the storage location destination on the list that is serviced by this indirect route chain. Accordingly, the storage location will be reachable from a compute node through the use of indirect routes. If the condition is false, then the storage location is only accessible through a single direct route. Accordingly, the storage location will not be reachable from the compute network node through the use of indirect routes.

This process is repeated for any change in network integrity on all networks to which this compute node is connected according an embodiment.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

Further, as will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer system for providing direct mapped routers located across independently managed compute and storage networks and enabling multiple modes of communication over cross-coupled links, the system comprising:
a memory and a processor, the system configured to perform a method comprising:
identifying a characteristic of a local entity based on a unique location identifier assigned to the local entity;
learning a characteristic of a remote entity based on a location identifier received over a cross-coupled link between the local entity and the remote entity;
correlating a port on a local entity router with the received location identifier of the remote entity;
building a route in the direct mapped router table at a location pointed to by the location identifier of the remote entity; and
establishing an optimistic failover route from a storage entity to a compute entity by passing through an intermediate compute entity when a cross-coupled link between the storage entity and the compute entity is broken,
wherein the establishing of an optimistic failover route comprises passing through an intermediate compute entity, the optimistic failover route is found through an indirect route validity table lookup for every compute entity location within the compute entity in which a failover route is needed by a compute entity destination, and
wherein responsive to identifying a route having a direct connection to a storage node location that is not a failover route, using the route as a failover route to the compute entity destination.

2. The computer system of claim 1, wherein the optimistic failover route is found through an indirect route validity table lookup for every compute entity location within the compute entity in which a failover route is needed by a compute entity destination.

3. A computer program product for providing direct mapped routers located across independently managed compute and storage networks and enabling multiple modes of communication over cross-coupled links, the computer program product comprising:
a tangible storage medium readable by a processing circuit and storing instructions for execution by the processing circuit for performing a method comprising:
identifying a characteristic of a local entity based on a unique location identifier assigned to the local entity;
learning a characteristic of a remote entity based on a location identifier received over a cross-coupled link between the local entity and the remote entity;
correlating a port on a local entity router with the received location identifier of the remote entity;
building a route in the direct mapped router table at a location pointed to by the location identifier of the remote entity; and
establishing an optimistic failover route from a storage entity to a compute entity by passing through an intermediate compute entity when a cross-coupled link between the storage entity and the compute entity is broken,
wherein the establishing of an optimistic failover route comprises passing through an intermediate compute entity, the optimistic failover route is found through an indirect route validity table lookup for every compute entity location within the compute entity in which a failover route is needed by a compute entity destination, and
wherein responsive to identifying a route having a direct connection to a storage node location that is not a failover route, using the route as a failover route to the compute entity destination.

4. The computer program product of claim 3, wherein the optimistic failover route is found through an indirect route validity table lookup for every compute entity location within the compute entity in which a failover route is needed by a compute entity destination.

* * * * *